United States Patent [19]

Tirpak et al.

[11] Patent Number: 5,300,556
[45] Date of Patent: Apr. 5, 1994

[54] PROCESS FOR THE PREPARATION OF AQUEOUS DISPERSIONS CONTAINING BOTH BLOCKED POLYISOCYANATES AND POLYHYDROXYL COMPOUNDS

[75] Inventors: Robin E. Tirpak, Wheeling; James W. Rosthauser, Glendale, both of W. Va.

[73] Assignee: Miles Inc., Pittsburgh, Pa.

[21] Appl. No.: 977,330

[22] Filed: Nov. 17, 1992

Related U.S. Application Data

[63] Continuation of Ser. No. 733,560, Jul. 23, 1991, abandoned.

[51] Int. Cl.⁵ .......................... C08J 3/00; C08K 3/20; C08L 75/00; C08G 18/00
[52] U.S. Cl. ...................... 524/591; 528/44; 528/45; 528/65; 528/85
[58] Field of Search ................ 524/591; 528/44, 45, 528/65, 85

[56] References Cited

U.S. PATENT DOCUMENTS

| | | | |
|---|---|---|---|
| 4,098,933 | 7/1978 | Burkhardt et al. | 427/379 |
| 4,284,544 | 8/1981 | Wegner et al. | 260/29.2 TN |
| 4,442,259 | 4/1984 | Isgur et al. | 524/591 |
| 4,522,851 | 6/1985 | Rosthauser | 427/386 |

Primary Examiner—Paul R. Michl
Assistant Examiner—P. Niland
Attorney, Agent, or Firm—Joseph C. Gil; Thomas W. Roy

[57] ABSTRACT

The present invention is directed to a process for the preparation of an aqueous dispersion containing both a blocked polyisocyanate and a polyhydroxyl compound by reacting an aqueously dispersed polyisocyanate having an isocyanate content of at least 12% by weight, based on the weight of the polyisocyanate, with a monofunctional blocking agent which is more reactive with isocyanate groups than water at an equivalent ratio of monofunctional blocking groups to isocyanate groups of 0.5:1 to 2:1 in the presence of a polyhydroxyl compound which is either water soluble or water dispersible, wherein the polyhydroxyl compound is present in an amount which is sufficient to provide an equivalent ratio of hydroxyl groups to blocked isocyanate groups of 0.6:1 to 1.25:1.

12 Claims, No Drawings

PROCESS FOR THE PREPARATION OF AQUEOUS DISPERSIONS CONTAINING BOTH BLOCKED POLYISOCYANATES AND POLYHYDROXYL COMPOUNDS

This application is a continuation of application Ser. No. 07/733,560 filed Jul. 23, 1991 now abandoned.

BACKGROUND OF THE INVENTION

1. Field of the Invention

The present invention is directed to an improved process for the preparation of aqueous dispersions containing both blocked polyisocyanates and polyhydroxyl compounds.

2. Description of the Prior Art

U.S. Pat. Nos. 4,522,851, 4,098,933 and 4,284,544 are directed to the preparation of blocked polyisocyanates which are subsequently dispersed in water and used as crosslinkers for isocyanate-reactive compounds. The disadvantage of blocking the polyisocyanate before it is dispersed in water is that the blocked polyisocyanate is generally a solid or a high viscosity liquid which is very difficult or impossible to disperse in water without first diluting the blocked polyisocyanate in an organic solvent or heating the blocked polyisocyanate to an elevated temperature to reduce its viscosity.

Because one of the primary reasons for dispersing polyurethanes and polyisocyanates in water is to avoid the unnecessary use of organic solvents, it is certainly not desirable to have to dilute the blocked polyisocyanate with an organic solvent in order to reduce its viscosity sufficiently to disperse it in water. In addition, the extra energy costs and time which are necessary to heat the blocked polyisocyanate to an elevated temperature to reduce its viscosity are also undesirable.

It is possible to overcome these difficulties in accordance with copending application, Ser. No. 07/734,708, which discloses dispersing the polyisocyanate in water prior to reacting the polyisocyanate with a blocking agent which is more reactive with isocyanate groups than water, most preferably an oxime. The copending application also discloses the addition of isocyanate-reactive compounds for reaction with the isocyanate groups of the blocked polyisocyanate after release of the blocking agent, provided that they are added after the blocking reaction is complete. It is disclosed that these isocyanate-reactive compounds should be added after the blocking reaction. Otherwise, their presence could interfere with the reaction between the isocyanate groups and the blocking agent.

Therefore, one of the disadvantages of the process disclosed in the copending application is the need for an additional mixing step to blend the isocyanate-reactive compounds with the blocked polyisocyanate.

Accordingly, an object of the present invention is to is provide a process for preparing an aqueous dispersion of a blocked polyisocyanate in combination with a coreactant which does not require an additional mixing step.

Surprisingly, this object may be achieved in accordance with the present invention as described hereinafter.

SUMMARY OF THE INVENTION

The present invention is directed to a process for the preparation of an aqueous dispersion containing both a blocked polyisocyanate and a polyhydroxyl compound by reacting an aqueously dispersed polyisocyanate having an isocyanate content of at least 12% by weight, based on the weight of the polyisocyanate, with a monofunctional blocking agent which is more reactive with isocyanate groups than water at an equivalent ratio of monofunctional blocking groups to isocyanate groups of 0.5:1 to 2:1 in the presence of a polyhydroxyl compound which is either water soluble or water dispersible, wherein the polyhydroxyl compound is present in an amount which is sufficient to provide an equivalent ratio of hydroxyl groups to blocked isocyanate groups of 0.6:1 to 1.25:1.

DETAILED DESCRIPTION OF THE INVENTION

Suitable polyisocyanates for use in preparing the polyisocyanates to be dispersed in water in accordance with the present invention include the known aliphatic, cycloaliphatic, araliphatic, aromatic and heterocyclic polyisocyanates. Suitable examples of these polyisocyanates include those described by W. Siefken in Justus Liebigs Annalen der Chemie, 562, pages 75 to 136. Prior to being dispersed in water, the polyisocyanates have an isocyanate content of at least about 12%, preferably at least about 15% and more preferably at least about 20% by weight, based on the weight of the polyisocyanate. Polyisocyanates having a lower isocyanate content and prepared, e.g., by reacting a monomeric polyisocyanate with a high molecular weight polyol, have sufficiently high viscosities that it is difficult to disperse them in water even if they are hydrophilically modified.

Examples of suitable monomeric polyisocyanates include 1,6-hexamethylene diisocyanate, 1,12-dodecane diisocyanate, cyclobutane-1,3-diisocyanate, cyclohexane-1,3-and/or -1,4-diisocyanate, 1-isocyanato-3,3,5-trimethyl-5-isocyanatomethyl cyclohexane (isophorone diisocyanate), 2,4-and/or 2,6-hexahydrotoluylene diisocyanate, hexahydro-1,3-and/or -1,4-phenylene diisocyanate, perhydro-2,4'- and/or -4,4'-diphenylmethane diisocyanate, 1,3- and/or 1,4-phenylene diisocyanate, 2,4- and/or 2,6-toluylene diisocyanate, diphenylmethane-2,4'- and/or -4,4'-diisocyanate, napthalene-1,5-diisocyanate, triphenylmethane-4,4',4''-triisocyanate and polyphenyl polymethylene polyisocyanates obtained by phosgenating aniline/formaldehyde condensation products. Also suitable are polyisocyanates adducts containing urea, biuret, urethane, allophanate, uretdione or carbodiimide groups or isocyanurate rings. These adducts may be prepared from any known monomeric polyisocyanates, especially those set forth above, by known methods. When using low molecular weight, highly volatile diisocyanates, it is especially preferred to convert these diisocyanates into adducts with lower monomeric diisocyanate contents prior to dispersing them in water. It is also possible to use mixtures of any of these monomeric polyisocyanates and/or polyisocyanate adducts.

In general, it is particularly preferred to use readily available polyisocyanates such as polyphenyl polymethylene polyisocyanates ("crude MDI") and polyisocyanate adducts containing carbodiimide groups, urethane groups, allophanate groups, isocyanurate groups, uretdione groups or biuret groups, especially those based on 2,4- and/or 2,6-toluylene diisocyanate ("TDI"), 1,6-hexamethylene diisocyanate, isophorone diisocyanate and mixtures thereof.

The polyisocyanates or polyisocyanate adducts used to prepare the aqueous dispersions of the present invention may be used in their unmodified, hydrophobic form or preferably they may be rendered hydrophilic by admixture with external emulsifiers or by reaction with cationic, anionic and/or nonionic compounds containing isocyanate-reactive groups. The reaction components which ensure the dispersibility of the polyisocyanates include compounds containing lateral or terminal, hydrophilic ethylene oxide units and compounds containing ionic groups or potential ionic groups.

The compounds containing lateral or terminal, hydrophilic ethylene oxide units contain at least one, preferably one, isocyanate-reactive group and are used in an amount sufficient to provide a content of hydrophilic ethylene oxide units of up to about 40% by weight, preferably about 5 to 40% by weight and more preferably about 10 to 35% by weight, based on the weight of the polyisocyanate. The compounds containing ionic groups or potential ionic groups contain at least one, preferably two, isocyanate-reactive groups and are used in an amount of up to about 120 milliequivalents, preferably about 5 to 80 milliequivalents, more preferably about 10 to 60 milliequivalents and most preferably about 15 to 50 milliequivalents per 100 grams of polyisocyanate.

Hydrophilic components having terminal or lateral hydrophilic chains containing ethylene oxide units include compounds corresponding to the formulae

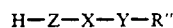

or

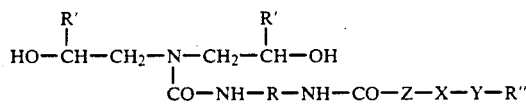

wherein
R represents a difunctional radical obtained by removing the isocyanate groups from a diisocyanate corresponding to those previously set forth,
R' represents hydrogen or a monovalent hydrocarbon radical containing from 1 to 8 carbon atoms, preferably hydrogen or a methyl group,
R" represents a monovalent hydrocarbon radical having from 1 to 12 carbon atoms, preferably an unsubstituted alkyl radical having from 1 to 4 carbon atoms,
X represents the radical obtained by removing the terminal oxygen atom from a polyalkylene oxide chain having from 5 to 90 chain members, preferably 20 to 70 chain members, wherein at least about 40%, preferably at least about 65%, of the chain members comprise ethylene oxide units and the remainder comprises other alkylene oxide units such as propylene oxide, butylene oxide or styrene oxide units, preferably propylene oxide units,
Y represents oxygen or —NR'"— wherein R'" has the same definition as R" and
Z represents a radical which corresponds to Y, but may additionally represent —NH—.

The compounds corresponding to the above formulae may be produced by the methods according to U.S. Pat. Nos. 3,905,929, 3,920,598 and 4,190,566 (the disclosures of which are herein incorporated by reference). The monofunctional hydrophilic synthesis components are produced, for example, by alkoxylating a monofunctional compound such as n-butanol or N-methyl butylamine, using ethylene oxide and optionally another alkylene oxide, preferably propylene oxide. The resulting product may optionally be further modified (although this is less preferred) by reaction with ammonia to form the corresponding primary amino polyethers.

The compounds containing ionic groups or potential ionic groups for providing hydrophilicity to the polyisocyanates may be cationic or anionic. Examples of anionic groups include carboxylate groups and sulphonate groups. Examples of cationic groups include tertiary and quaternary ammonium groups and tertiary sulphonium groups. The ionic groups are formed by neutralizing the corresponding potential ionic groups either prior to, during or after their reaction with the polyisocyanate. When the potential ionic groups are neutralized prior to forming the modified polyisocyanate, ionic groups are incorporated directly. When neutralization is performed subsequent to forming the prepolymer, potential ionic groups are incorporated. Suitable compounds for incorporating the previously discussed carboxylate, sulphonate, tertiary sulphonium and tertiary or quaternary ammonium groups are described in U.S. Pat. Nos. 3,479,310, 4,108,814, 3,419,533 and 3,412,054, the disclosures of which are herein incorporated by reference.

In addition to the previously discussed hydrophilic modifiers, which are chemically incorporated into the polyisocyanates, it is also possible to use external emulsifiers which may be anionic, cationic or nonionic. Further, when dispersion stability is not a specific requirement, it is possible to disperse the polyisocyanate in water in the absence of emulsifiers by using high shear mixers, for example, those disclosed in British Patents 1,414,930, 1,432,112 and 1,428,907 as well as German Offenlegungsschrift 2,347,299. Low shear mixers may also be used to disperse the polyisocyanates in water such as the stator-rotor dynamic mixer disclosed in U.S. Pat. No. 4,742,095.

The polyisocyanates to be dispersed in water preferably have a functionality of at least 2, more preferably at least 2.2. These compounds may be prepared by reacting polyisocyanates having functionalities of greater than 2 with a monofunctional compound containing hydrophilic groups, provided that the average functionality remains at least 2. When diisocyanates are used as the polyisocyanate, it is preferred to use difunctional compounds containing hydrophilic groups in order to maintain a functionality of at least 2. The treatment of diisocyanates with monofunctional compounds containing hydrophilic groups is less preferred since this reduces the functionality to less than 2. Accordingly, the functionality of the component containing hydrophilic groups and the functionality of the polyisocyanate must be taken into consideration in order to ensure that the modified polyisocyanates have functionalities of at least 2.

The polyisocyanate dispersions generally have a solids content of about 2 to 50, preferably about 10 to 30 weight percent.

After the polyisocyanates have been dispersed in water, at least a portion of the isocyanate groups of the polyisocyanates are reacted with a monofunctional blocking agent which is more reactive with isocyanate groups than water in the presence of a polyhydroxyl compound. Examples of suitable blocking agents include secondary aromatic amines such N-methylaniline; the N-methyl toluidines, N-phenyl toluidine and N-phenyl xylidene; N-alkyl amides such as N-methyl acetamide; imides such as succinimide; lactams such as ε-caprolactam and δ-valerolactam; mercaptans such as methylmercaptan, ethyl mercaptan, butyl mercaptan, 2-mercapto-benzothiazole, and dodecyl mercaptan; triazoles such as 1H-1,2,4-triazole; preferably alkali metal bisulfites; and more preferably oximes.

The oximes preferably correspond to the formula

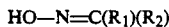

wherein

R$_1$ and R$_2$ may be the same or different and represent hydrogen or an alkyl or aralkyl group having 1 to 10 carbon atoms, provided that both R$_1$ and R$_2$ are not hydrogen, or the two groups together with the oxime carbon atom may form a cycloaliphatic ring containing 4 to 8 carbon atoms.

Suitable oxime blocking agents include methyl ethyl ketoxime, methyl isobutyl ketoxime, acetone oxime, cyclohexanone oxime and methyl n-amyl ketoxime, methyl n-propyl ketoxime, methyl isopropyl ketoxime, diethyl ketoxime, methyl sec-butyl ketoxime, ethyl butyl ketoxime and acetophenone oxime.

The equivalent ratio of monofunctional blocking groups to isocyanate groups is 0.5:1 to 2:1, preferably about 0.8:1 to 1.2:1, more preferably 0.9:1 to 1.1:1 and most preferably about 1:1. If an excess of blocking groups is used, the excess may be removed after the blocking reaction is complete. However, to avoid the necessity of removing this excess, it is preferred not to use an excess of the blocking agent.

Any isocyanate groups which are not blocked by the blocking agent may be left to react with water or the polyhydroxyl compound. However, because of the large molar excess of hydroxyl groups available from water compared to the hydroxyl groups available from the polyhydroxyl compounds, most of the isocyanate groups which are not blocked will react with water.

In accordance with another, less preferred embodiment of the present invention, a portion of the isocyanate groups of the dispersed polyisocyanate may also be reacted with isocyanate-reactive compounds which are more reactive with isocyanate groups than water and have a functionality of at least 2. Examples of these compounds are the polyamines having a molecular weight of less than 400 and containing two or more primary and/or secondary amino groups which are disclosed in copending application, U.S. Ser. No. 07/677,010, filed Mar. 28, 1991, the disclosure of which is herein incorporated by reference.

The amount of the these isocyanate-reactive compounds is chosen to provide an equivalent ratio of isocyanate-reactive groups which are more reactive than water to isocyanate groups of the dispersed polyisocyanate of less than 0.4:1.0, preferably less than 0.2:1.0 and more preferably less than 0.1:1.0. Lower limits for the amount of these compounds are chosen to provide an equivalent ratio of isocyanate-reactive groups which are more reactive than water to isocyanate groups of 0.02:1.0, preferably 0.05:1.0.

It is believed that the amino groups react with the isocyanate groups on the surface of the dispersed polyisocyanates to form urea groups which encapsulate the dispersed polyisocyanates. Because this encapsulation may interfere with the reaction between the isocyanate groups and the blocking agent, it is preferred not to add significant amounts of the polyamines for reaction with the dispersed polyisocyanate. If the incorporation of urea groups is desired, it is possible to react the polyamines with the polyisocyanate before the polyisocyanate is dispersed in water as previously described.

In accordance with the present invention the blocking reaction is conducted in the presence of a polyhydroxyl compound which is either water soluble or water dispersible, optionally in the presence of an external emulsifier. The polyhydroxyl compounds react with the polyisocyanates in a subsequent heating step during which the water is evaporated and the blocking agent is released. Suitable polyhydroxyl compounds have a molecular weight (as determined by end group analysis) of 62 to 10,000, contain two or more hydroxyl groups and are either water soluble or dispersible in water, optionally in the presence of an external emulsifier. Preferably, these compounds do not contain urea or urethane groups due to the fact that these groups increase the viscosity and hydrophobicity of the polyhydroxyl compounds and make it more difficult to maintain them dissolved or dispersed in water.

Examples of suitable polyhydroxyl compounds are the polyhydroxyl polyesters, polylactones, polycarbonates, polyethers, polythioethers, polyacetals, polyether esters, polyester amides, polyamides and polyacrylates which are known from polyurethane chemistry and have a molecular weight of 400 to 10,000, preferably 1000 to 6000. Also suitable are the known low molecular weight polyors having a molecular weight of 32 to less than 400. Examples of these polyhydroxyl compounds are disclosed in U.S. Pat. No. 4,925,885, the disclosure of which is herein incorporated by reference.

An advantage of polyhydroxyl compounds which are water soluble or water dispersible in the absence of an external emulsifier over those which are rendered water soluble or dispersible by the use of an external emulsifier is that an extra mixing step is avoided for mixing the emulsifier with the polyhydroxyl compound. Any of the previously mentioned polyhydroxyl compounds may be rendered water soluble or dispersible by the incorporation of polyethylene oxide units, salt (ionic) groups or potential salt (ionic) groups which are subsequently neutralized during their preparation.

When the aqueous dispersions containing blocked polyisocyanates and polyhydroxyl compounds are to be used as binders for fiberglass, the water soluble, low molecular weight polyols such as butane diol are especially preferred polyhydroxyl compounds because these binders provide a combination of hardness and solvent resistance which is very desirable for this application.

The blocking agent and polyhydroxyl compound may be added to the water either before, during or after the polyisocyanate has been dispersed. Preferably, the polyisocyanate is first dispersed in water and then the blocking agent and polyhydroxyl compound are added to the dispersed polyisocyanate. In one embodiment of the present invention the polyisocyanate may be dispersed in water in a first mixing step, and subsequently the blocking agent and polyhydroxyl compound can be blended with the dispersed polyisocyanate in a second mixing step. Suitable apparatus for performing these mixing steps have previously been disclosed for dispersing the polyisocyanate in water and also include the mixing apparatus disclosed in copending application, U.S. Ser. No. 07/677,002, filed Mar. 28, 1991, the disclosure of which is herein incorporated by reference.

In accordance with the present invention, it is also possible to incorporate additives into the aqueous dispersions of encapsulated polyisocyanates. The additives may be present in the form of a solution or in the form of an emulsion or dispersion. These additives are known and include catalysts such as tertiary amines, aminosilanes having carbon-silicon bonds, ammonium hydroxides and organo metallic compounds; surface-active agents; reaction retarders; and adhesion promoters. Examples of suitable additives which may optionally be used in accordance with the present invention and details on the way in which these additives are to be used and how they function may be found in Kunststoff-Handbuch, Vol. VII, published by Vieweg and Hochtlen, Carl-Hanser-Verlag, Munich 1966, for example on pages 103 to 113.

The aqueous dispersions of blocked polyisocyanates and polyhydroxyl compounds obtained in accordance with the present invention may be used in any of the known applications for such systems, e.g., as binders for fiberglass. The dispersions according to the present invention are also suitable to improve the properties (such as adhesion, solvent resistance and abrasion resistance) of many other aqueous polymer dispersions such as acrylic, epoxy, polyvinyl acetate and styrene/butadiene rubber dispersions.

The invention is further illustrated but is not intended to be limited by the following examples in which all parts and percentages are by weight unless otherwise specified.

EXAMPLES

Example 1

Preparation of an Aromatic Water-Dispersible Polyisocyanate

A three liter round bottom flask equipped with a thermometer, drying tube, condenser, and stirrer was charged with 549 parts of Crude MDI[1] and 274.5 parts of a monofunctional poly(ethylene oxide) ether[2]. The temperature of the reaction flask was increased to 70° C. The reaction proceeded at this temperature for four hours at which time the isocyanate content was determined by titration to be 20.42% (theoretical NCO=20.75%). The modified polyisocyanate was cooled to ambient temperature and placed in dry containers.

[1] An aniline/formaldehyde condensation product containing 4,4'-diphenylmethane diisocyanate and about 50% of higher functionality homologs and having an isocyanate content of about 31.5% and a viscosity at 25° C. of 200 mpa.s.
[2] A polyether monohydric alcohol having a molecular weight of 2200 and prepared from n-butanol, ethylene oxide and propylene oxide (molar ratio of ethylene oxide to propylene oxide - 83:17).

Example 2

Blocking of an Aromatic Water-Dispersible Polyisocyanate in the Presence of 1,4-Butanediol (Addition of Blocking Agent and Coreactant to Dispersed Isocyanate)

125 grams of the water-dispersible polyisocyanate of Example 1 were dispersed under agitation in a two liter resin flask containing 202.74 grams of demineralized water at ambient temperature. To the dispersed polyisocyanate was added a mixture of 27.32 grams of 1,4-butanediol, 52.82 grams of butanone oxime (MEKO), and 27.32 grams of demineralized water. The reaction exothermed to 42° C. The off-white dispersion had a viscosity of 60 mpa.s at 32° C. and a pH of 4.21. To a portion of the dispersion was added 0.05% of a silicone containing flow agent (SILWET L-77, available from Union Carbide). The film (5 mils wet on glass, oven cured at 150° C. for 45 minutes) was clear, yellow and continuous. It had a pencil hardness of 4H, adhesion by tape test of 5B, MEK double rub of >200, and was not sensitive to the water spot test.

Example 3

Blocking of an Aromatic Water-Dispersible Polyisocyanate in the Presence of 1,4-Butanediol (Addition of Isocyanate into the Dispersing Water Containing Blocking Agent and Coreactant)

125 grams of the water-dispersible polyisocyanate of Example 1 were dispersed under agitation in a two liter resin flask containing 230.06 grams of demineralized water, 27.32 grams of 1,4-butanediol, and 52.82 grams of methyl ethyl ketoxime at ambient temperature. The reaction exothermed to 40° C. The off-white dispersion had a viscosity of 50 mpa.s at 28° C. and a pH of 4.25. To a portion of the dispersion was added 0.05% of a silicone containing flow agent (SILWET L-77, available from Union Carbide). The film (5 mils wet on glass, oven cured at 150° C. for 45 minutes) was clear, yellow and continuous with surface imperfections. It had a pencil hardness of 4H, adhesion by tape test of 5B, MEK double rub of >200, and was not sensitive to the water spot test.

Example 4

(Comparison) A Two Step Procedure (Addition of the Isocyanate into Dispersing Water Containing Blocking Agent, then Adding Coreactant).

125 grams of the water-dispersible polyisocyanate of Example 1 were dispersed under agitation in a two liter resin flask containing 230.06 grams of demineralized water and 52.82 grams of methyl ethyl ketoxime at ambient temperature. The reaction exothermed to 40° C.

After three days 27.32 grams of 1,4-butanediol were added to the off-white dispersion. The dispersion had a viscosity of 40 mpa.s at 28° C. and a pH of 4.26. To a portion of the dispersion was added 0.05% of a silicone containing flow agent (SILWET L-77, available from Union Carbide). The film (5 mils wet on glass, oven cured at 150° C. for 45 minutes) was clear, yellow and continuous with surface imperfections. It had a pencil hardness of 4H, adhesion by tape test of 5B, MEK double rub of >200, and was not sensitive to the water spot test.

Film testing procedures:
  Pencil Hardness—ASTM D3363
  Adhesion to Tape Test—ASTM D3359-83
  MEK Double Rubs—Number of double rubs with a cotton cheese cloth saturated with MEK that were necessary to begin to remove the coating from the glass plate.
  Water Spot Sensitivity—One drop of water was placed on the coating for one hour, then the film was checked to see if the water had any effect. If the film had a haze or was easier to remove from the glass where the water spot was, it would be considered sensitive.

It is an obvious conclusion by comparing the results of the examples according to the present invention that the blocking of the isocyanate takes place in the presence of the coreactant. Films prepared according to the present invention have properties nearly identical to those that are prepared in the comparison two step process but do not require the additional process step.

Although the invention has been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. A process for the preparation of an aqueous dispersion containing both a blocked polyisocyanate and a polyhydroxyl compound which comprises reacting an aqueously dispersed polyisocyanate having an isocyanate content of at least 12% by weight, based on the weight of the polyisocyanate, with a monofunctional blocking agent which is more reactive with isocyanate groups than water at an equivalent ratio of monofunctional blocking groups to isocyanate groups of 0.5:1 to 2:1 in the presence of a polyhydroxyl compound which is either water soluble or water dispersible, wherein the polyhydroxyl compound is present in an amount which is sufficient to provide an equivalent ratio of hydroxyl groups to blocked isocyanate groups of 0.6:1 to 1.25:1.

2. The process of claim 1 wherein said monofunctional blocking agent comprises an oxime which corresponds to the formula $$HO-N=C(R_1)(R_2)$$

wherein
  $R_1$ and $R_2$ may be the same or different and represent hydrogen or an alkyl or aralkyl group having 1 to 10 carbon atoms, provided that both $R_1$ and $R_2$ are not hydrogen, or the two groups together with the oxime carbon atom may form a cycloaliphatic ring containing 4 to 8 carbon atoms.

3. The process of claim 1 wherein said dispersed polyisocyanate is rendered hydrophilic by reaction with a compound containing a lateral or terminal nonionic hydrophilic group.

4. The process of claim 1 wherein said equivalent ratio of monofunctional blocking groups to isocyanate groups is 0.8:1.0 to 1.2:1.0.

5. The process of claim 2 wherein said equivalent ratio of monofunctional blocking groups to isocyanate groups is 0.8:1.0 to 1.2:1.0.

6. The process of claim 3 wherein said equivalent ratio of monofunctional blocking groups to isocyanate groups is 0.8:1.0 to 1.2:1.0.

7. A process for the preparation of an aqueous dispersion containing both a blocked polyisocyanate and a polyhydroxyl compound which comprises reacting an aqueously dispersed polyisocyanate having an isocyanate content of at least 12% by weight, based on the weight of the polyisocyanate, with a monofunctional blocking agent which is more reactive with isocyanate groups than water at an equivalent ratio of monofunctional blocking groups to isocyanate groups of 0.5:1 to 2:1 in the presence of a polyhydroxyl compound which is water soluble and has a molecular weight of 62 to less than 400, wherein the polyhydroxyl compound is present in an amount which is sufficient to provide an equivalent ratio of hydroxyl groups to blocked isocyanate groups of 0.6:1 to 1.25:1.

8. The process of claim 7 wherein said monofunctional blocking agent comprises an oxime which corresponds to the formula $$HO-N=C(R_1)(R_2)$$

wherein
  $R_1$ and $R_2$ may be the same or different and represent hydrogen or an alkyl or aralkyl group having 1 to 10 carbon atoms, provided that both $R_1$ and $R_2$ are not hydrogen, or the two groups together with the oxime carbon atom may form a cycloaliphatic ring containing 4 to 8 carbon atoms.

9. The process of claim 7 wherein said dispersed polyisocyanate is rendered hydrophilic by reaction with a compound containing a lateral or terminal nonionic hydrophilic group.

10. The process of claim 7 wherein said equivalent ratio of monofunctional blocking groups to isocyanate groups is 0.8:1.0 to 1.2:1.0.

11. The process of claim 8 wherein said equivalent ratio of monofunctional blocking groups to isocyanate groups is 0.8:1.0 to 1.2:1.0.

12. The process of claim 9 wherein said equivalent ratio of monofunctional blocking groups to isocyanate groups is 0.8:1.0 to 1.2:1.0.

* * * * *